United States Patent [19]

Sklebitz

[11] Patent Number: 5,541,974
[45] Date of Patent: Jul. 30, 1996

[54] REAL-TIME X-RAY VIDEO IMAGING SYSTEM HAVING A CCD SOLID STATE IMAGE SENSOR

[75] Inventor: Hartmut Sklebitz, Erlangen, Germany

[73] Assignee: Siemens Aktiengesellschaft, Munich, Germany

[21] Appl. No.: 490,661

[22] Filed: Jun. 15, 1995

[30] Foreign Application Priority Data

Jun. 15, 1994 [DE] Germany .......................... 44 20 833.2

[51] Int. Cl.$^6$ ..................................................... H05G 1/64
[52] U.S. Cl. ........................ 378/98.8; 378/98.12
[58] Field of Search .............................. 378/98.7, 98.8, 378/98.12, 98.5

[56] References Cited

U.S. PATENT DOCUMENTS

| | | | |
|---|---|---|---|
| 4,423,521 | 12/1983 | Haendle et al. | 378/108 |
| 4,509,077 | 4/1985 | Therrien | 358/139 |
| 5,461,658 | 10/1995 | Joosten | 378/98.7 |

FOREIGN PATENT DOCUMENTS

3236147A1  3/1984  Germany.

OTHER PUBLICATIONS

Kodak Brochure for KAI–1000 Megapixel Interline CCD imager (Feb. 6, 1990)).

*Primary Examiner*—Don Wong
*Attorney, Agent, or Firm*—Hill, Steadman & Simpson

[57] ABSTRACT

An x-ray video image system has a CCD sensor used in the production of a video image from an x-ray image, with an optimum image quality being achieved with a high read-out speed. A light source uniformly illuminates the CCD sensor before the production of an x-ray image. The outputs of the sensor from successively scanned image lines are supplied respectively to a main processing channel and to an adjustable measurement channel. By comparing the processed outputs of these two channels deviations of the image signal from predetermined values are identified. Components in the measurement channel are then adjusted until the deviations are substantially eliminated. Black level matching, white level matching, and linearity matching between the two channels can be accomplished.

7 Claims, 1 Drawing Sheet

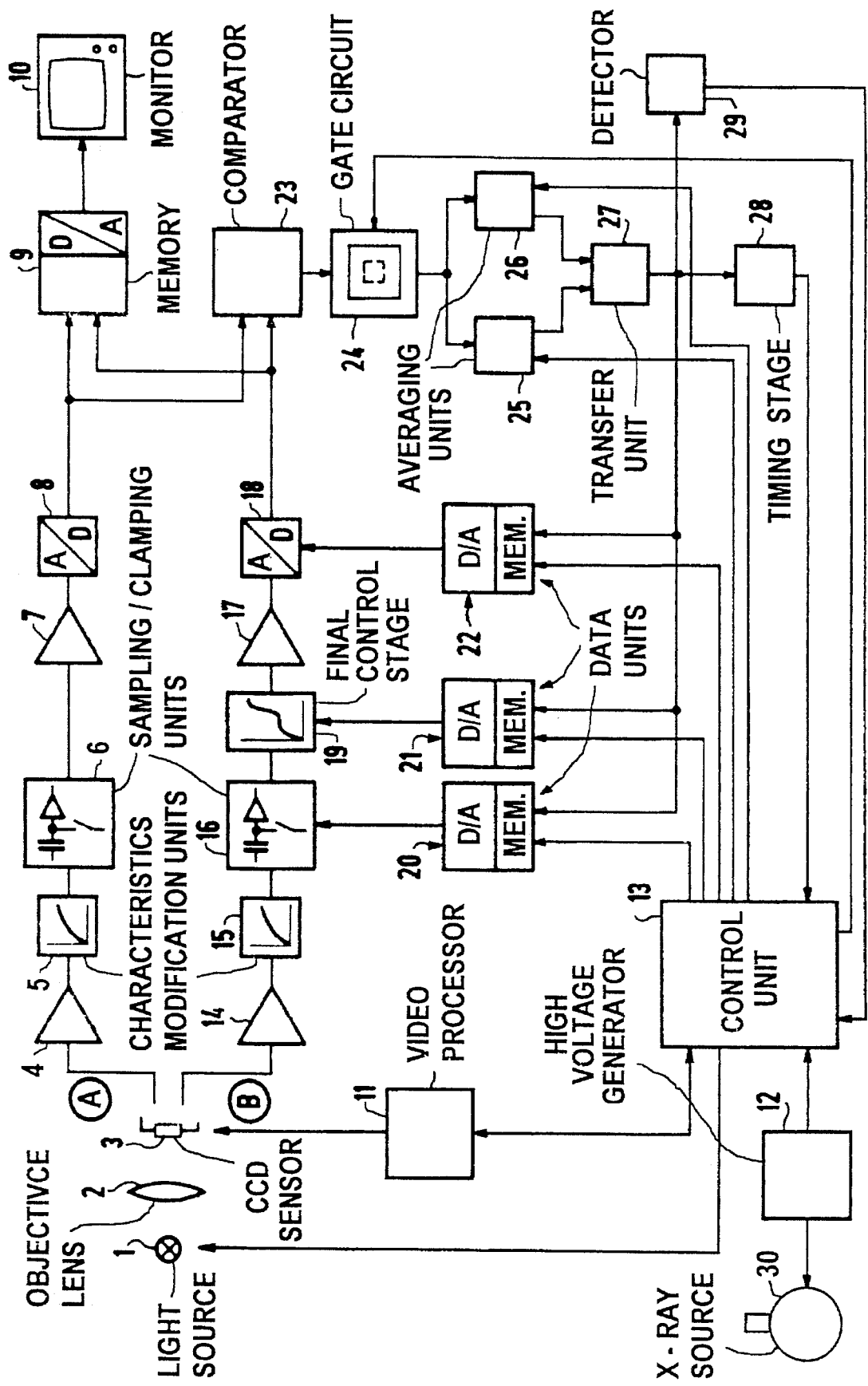

REAL-TIME X-RAY VIDEO IMAGING SYSTEM HAVING A CCD SOLID STATE IMAGE SENSOR

BACKGROUND OF THE INVENTION

1. Field of the Invention

The present invention is directed to a system for producing a real-time video image from an x-ray image, of the type employing a CCD solid-state image sensor for converting light signals corresponding to the x-ray image into electrical signals.

2. Description of the Prior Art

Although CCD sensors are widely used in the production of images for display or storage, CCD sensor are limited in read-out speed. The cause lies in the frequency response of the output amplifier on the chip or in the limited shift speed of the charges in the registers of the CCD sensor.

In order to realize higher read-out speeds, CCD sensors that have two or four outputs, via which different portions of the image are simultaneously read out, are known.

A problem with such multiple output CCD sensors is that the respective amplifiers connected to each output unavoidably have characteristics that deviate slightly from one another (linearity error), so that the location where the separation of the sub-images lies in the CCD sensor is visible. This is an undesired effect that is of significance in diagnostic x-ray images because the demands made of amplitude resolution in, for example, digital radiography are extremely high.

A complicating factor when digitization is carried out is that analog-to-digital converters have additional linearity errors and long-term drift in the d.c. voltage level as well as in gain. These errors and additional influences of analog amplifiers that precede the sensor likewise lead to synchronization errors between the channels.

The errors can become especially undesirable when a steepening of the amplitude characteristic is required, for example logarithmizing for digital subtraction angiography.

As a consequence of the these problems and since digital corrections still require considerable processing times, it has heretofore been problematical to employ a CCD sensor with more than one output for applications sensitive to image quality, such as for high-resolution x-ray video imaging in a real-time mode. On the contrary, an operating mode had to be selected—insofar as possible—wherein only one output is employed. As a result, however, the maximum image frequency is reduced, thereby limiting the employment of such sensors in, for example, cardiology.

SUMMARY OF THE INVENTION

An object of the present invention is to provide a real-time x-ray video imaging system which employs a CCD sensor in the production of the image wherein a good image quality is achieved given a high read-out speed.

The above object is achieved in accordance with the principles of the present invention in a real-time x-ray video imaging system having a CCD sensor and a light source which uniformly illuminates the CCD sensor, the sensor output being supplied to two processing channels, one of the channels identifying deviations of the image signal produced from the sensor output signal from predetermined norms by comparison with the image signal from the other channel, and the system including a setting circuit which eliminates these deviations. In order to emphasize good correlation between the two channels in the most important regions of the image, only a selected region of the image, such as an image dominant, can be analyzed in this manner.

Control circuits that operate the image pick-up as well as the following signal processing (amplifier, characteristics modification, clamping) can be provided in the invention. A uniform pre-illumination should be employed for the acquisition of the synchronization errors. This is advantageously realized by a light source (for example, light-emitting diodes) in front of the objective of the video camera.

The basis of the invention is that deviations of the image signal from uniformity within an image region (dominant) are acquired and eliminated with suitable final control elements. The dominant preferably lies in the middle of the image.

Errors of three different categories that are independent of one another are to be eliminated:

1. D.C. voltage errors or LSB errors (least significant bit, the bit with the least weight): these are amplitude deviations of the darkest region of the image (for example, dark current irregularities).
2. Differences in the average linear gain in both channels, i.e. differences in the brightest image portions.
3. Differences in the linearity.

DESCRIPTION OF THE DRAWINGS

The single FIGURE is a schematic block diagram of a real-time x-ray video imaging system having a CCD solid-state image sensor, constructed in accordance with the principles of the present invention.

DESCRIPTION OF THE PREFERRED EMBODIMENTS

A digital version of the invention is described herein; analog embodiments are likewise possible.

In the pause times of the x-ray system (no fluoroscopy and no exposure mode, signalled by the high-voltage generator 12 of the x-ray system), a light source 1 illuminates the CCD sensor 3 via the objective 2. The CCD sensor 3 is driven by a video processor 11. The CCD sensor 3 has two outputs A and B, whose on-chip video amplifiers and analog signal pre-processing including double correlated sampling, as well as possible further pre-amplification, are combined in a pre-amplifier 4. The output of the pre-amplifier 4 is supplied to a characteristics modification unit 5, for example a logarithmizer for digital subtraction angiography. A sampling and clamping of the video signal ensues in a sampling/clamping unit 6 preceding a further amplifier 7 and an analog-to-digital converter 8. A digital memory 9 stores the entire image. The stored image is converted into analog signals for display on a monitor 10. The components 4 through 9 constitute a Channel A allocated to one output of the CCD sensor 3.

The necessary corrections for achieving synchronism should be implemented in the further channel B for the other output. This channel B includes a pre-amplifier 14 (corresponding to pre-amplifier 4), a characteristics modification unit 15 (corresponding to the characteristics modification unit 5), a sampling/clamping unit 16 (corresponding to the sampling/clamping 6), an amplifier 17 and an analog-to-digital converter 18 (corresponding respectively to the amplifier 7 and the converter 8). The digital memory 9 is allocated to both channels. Channel B additionally contains a final control stage 19 which matches the linearity of the channels. Linearization is achieved therein using at least one characteristics distorter curve. The sampling/clamping unit 16, the final control stage 19 and the analog-to-digital converter 18 respectively have data units 20, 21 and 22 allocated thereto. Each data unit 20, 21 and 22 contains a memory and digital-to-analog converter for storing and converting the data which are required for the matching which takes place in the respective units 16, 19 and 18. The data unit 20, therefore, stores and converts data for conducting matching of the image black level, i.e., dark current matching, the data unit 21 stores and converts data for linearity matching, such as data identifying the voltage value at which the bend in the distortion curve employed in the final control stage 19 occurs and the severity of this bend, and the data unit 22 stores and converts data for matching the image white level. The digital output signals of channels A and B are compared, by subtraction, in a comparator 23.

The output of the comparator 23 is supplied to a gate circuit 24. The gate circuit 24 is supplied with a control signal from the control unit 13 so that, if desired, only lines comprising selected portions, such as an image dominant, of the overall image are passed through to the remainder of the circuit. The lines or pixels comprising the image dominant are identified within the control unit 13, such as by operator-entered commands or information, and the gate circuit 24 is enabled to transmit the output of the comparator 23 to the respective inputs of the averaging units 25 and 26 only for the portion of the image for which channel matching is desired, and the gate circuit 24 otherwise prevents further transmission of the output of the comparator 23.

The averaging units 25 and 26, the operating details of which are described below, are operated in alternation by respective control signals (enabling signals) supplied from the control unit 13.

The outputs of the averaging units 25 and 26 are supplied to a transfer unit 27, the operation of which is also described in further detail below. Depending on which type of matching (i.e., black level matching, linearity matching or white level matching) for which the output of the comparator 23 is being used to effect, the output of the transfer unit 27 will be supplied to one of the memories in the respective data units 20, 21 and 22 for intermediate storage therein. The particular data unit 20, 21 or 22 to which the output of the transfer unit 27 is supplied is determined by a control signal from the control unit 13, which enables only the memory of one of the units 20, 21 or 22 at a time to receive the output of the transfer unit 27.

The output of the transfer unit 27 is also supplied to the input of a detector 29, the detailed operation of which is also described below, which upon the detection of a selected event, supplies a signal to the control unit 13.

The output of the transfer unit 27 is also supplied, for dark current matching, to the input of a timing stage 28, which, as explained in more detail below, undertakes a further selected analysis of the magnitude of the output of the transfer unit 27 which permits the processing in the averaging units 25 and 26, the transfer unit 27 and the detector 29 to continue until the output of the transfer unit 27 is sufficiently small, thereby indicating a sufficiently small difference between the inputs of the comparator 23, at which point it is assumed that the channels A and B are matched.

The CCD sensor 3 operates according to an interline transfer architecture, with two horizontal read-out registers. The video signals of an even-numbered image line, and the adjacent odd-numbered line of the frame, thus simultaneously occur at the outputs of the CCD sensor 3, and are respectively processed in the channels A and B.

The following matching or balancing procedures are undertaken in the system in accordance with the invention.

For matching the channels A and B for dark current, the light source 1 is turned off by the control unit 13. The resulting dark current image signals reaching the comparator 23 from each channel are subtracted in the comparator 23 and, as explained above, these signals are alternatingly supplied via the gate circuit 24 to the averaging units 25 and 26. The averaging units 25 and 26 calculate a running average of the signals respectively supplied thereto over a selected period of time, for example, one standard television frame, by adding the values of the successive inputs over this period of time. This period of time is ended by a control signal supplied to each of the averaging units 25 and 26 by the control unit 13, at which point the averages stored in the averaging units 25 and 26 are supplied to the transfer unit 27. For this dark current analysis, the transfer unit 27 first subtracts the incoming averages from the averaging units 25 and 26 to form a difference signal, and converts this difference signal into a number of pulses dependent on the magnitude of the difference and including a polarity indicator pulse identifying the mathematical sign of the difference.

The dark current analysis is used for matching the respective sampling/clamping units 6 and 16 in the channels A and B. The pulse sequence from the transfer unit 27 is therefore supplied to the memory of the data unit 20. For this purpose, the memory of the data unit 20 may be formed by an up/down counter which is incremented or decremented from a starting value, which may be zero, depending on the number of pulses and the polarity indicator supplied by the transfer unit 27. The digital output of the counter is converted into an analog value, and is used to increase or lower the signal in the dark portions of the image, by adjusting the sampling/clamping unit 16.

The output signal from the transfer unit 27 is also supplied to a timing stage 28, which may for this purpose be a monostable multi-vibrator which is reset by each difference which is sufficiently large to be "noticed" by the transfer unit 27. When the difference between the outputs of the averaging units 25 and 26 falls below the least significant bit of the transfer unit 27, the timing stage 28 supplies a signal to the control unit 13, which ends the dark current matching procedure. Until the signal is emitted from the timing stage 28, the above dark current matching procedure is successively repeated, with the sampling/clamping unit 16 being more finely adjusted with each repetition, until the matching is sufficiently successful so as to produce substantially no difference in the respective outputs of the channels A and B with the light source 1 unilluminated.

The next type of matching which can be undertaken in accordance with the invention is balancing or matching for the image white level. This takes place in a manner analogous to that described above for setting the dark current behavior, however, for this purpose the light source 1 is illuminated by a signal from the control unit 13 so as to drive the CCD sensor 3 to emit output signals just below a level at which blooming occurs. The steps for matching the white level are then undertaken in the same manner as described above for setting the dark current level, except instead of adjusting the sampling/clamping unit 16 via the data unit 20, the output of the transfer unit 27 is directed by the control unit 13 to be supplied to the input of the data unit 22, for adjusting the analog-to-digital converter 18. The output of the data unit 22 sets the conversion range of the analog-to-digital converter 18 so as to be matched to that of the analog-to-digital converter 8 by means of the above-described procedure.

Lastly, the system of the invention also undertakes matching of linearity deviations in the channels A and B. For this purpose, the light source 1 is operated by the control unit 13 so as to emit light in steps of increasing brightness, for example a brightness increase in successive steps from zero to the intensity just below that at which blooming occurs. Each brightness increase step is used to produce an image in the channels A and B.

For linearity matching, the comparator 23 again supplies a signal corresponding to the difference between the outputs of the channels A and B through the gate circuit 24 to the averaging units 25 and 26. Again, an image dominant or other region of interest can be the only portion of the region which is analyzed, by suitable operation of the gate circuit 24 by the control unit 13. In this case, the averaging units 25 and 26 again compute, in alternating fashion, respective running averages. The output of the averaging unit 25 is not enabled for transfer to the transfer unit 27 until the scanning of the last image is completed, and this is followed by the scanning of the next image and the calculation of a running average within the averaging unit 26. For the purpose of conducting a linearity matching, therefore, the transfer unit 27 functions as a buffer and alternatingly contains the output of the averaging unit 25 or the output of the averaging unit 26, dependent on which output has been last supplied thereto by the signal from the control unit 13.

Together with the measurement of the deviation of the linearity misalignment, it is also necessary that the "position" of the maximum deviation be transferred from the control unit 13 to the averaging unit 26, wherein it is stored. Therefore, after the completion of this procedure, the maximum deviation of alignment (including the direction of the deviation) and the signal amplitude at which this maximum deviation occurred, are available in the averaging unit 26. The control unit 13 causes the transfer of all of this information to the memory of the data unit 21 via the transfer unit 27 after the scanning procedure has been completed, for operating on the final control stage 19. The linearity of the channels A and B is matched using the final control stage 19. The final control stage 19 may be formed, for example, by a plurality of individual semiconductors (such as bipolar transistors or field effect transistors or diode/resistor combinations), or a dedicated integrated circuit. These circuit components, in combination, alter the distortion curve which is used by the final control stage 19 to effect the desired characteristics modification.

During the ongoing measurement process in the linearity matching procedure, the detector 29 receives the output of the transfer unit 27, which can only change after a predetermined time interval, as described above. The detector 29 operates in a manner similar to the timing stage 28, but instead of identifying when a minimum has occurred, the detector 29 identifies the maximum deviation which has occurred. Each time the transfer unit 27 supplies an output signal to the data unit 21, this is simultaneously supplied to the detector 29. The first time this occurs, this signal is stored in the detector 29. For each subsequent transfer from the transfer unit 27, the current value from the transfer unit 27 is compared in the detector 29 to the stored value and if the current value exceeds the stored value, the current value is replaced in the detector 29 as the new maximum value. When a new maximum occurs (i.e., each time a new maximum occurs) the detector 29 supplies a signal to the control unit 13, which correlates the occurrence of the maximum with the stepped brightness value which caused the maximum. When the stepping of the brightness is completed, the control unit 13 then "knows" which brightness level resulted in the maximum deviation.

The amplitude information (the information regarding where the maximum deviation is located over the range of amplitude, i.e., the position in the y-direction of the amplitude curve schematically shown in the final control stage 19) is supplied to the data unit 21, which in turn identifies a certain voltage which is used to cause a non-linearity in the incoming signal to the final control stage 19. This voltage may, for example, be a voltage which acts on a diode connected in series with a resistor so as to produce a selected impedance, or to operate a field effect transistor as a variable resistance. The magnitude and the polarity of the deviation determine the appropriate combination of components within the final control stage 19 so as to cause an opposite deformation of the incoming signal to the final control stage 19.

Because adjustment of the linearity can, under some circumstances have slight effects on the dark current matching and may have significant effects on the bright level matching, the control unit 13 repeats the entire procedure of dark level matching, light level matching and linearity matching until the differences between the channels A and B are adequately small.

The control unit 13 is also supplied with a signal from a circuit within the high-voltage generator 12 of the x-ray system. The high-voltage generator 12 supplies an x-ray source 30 with high voltage in a known manner for the production of x-rays, which are detected by a radiator detector which is considered herein as a part of the video processor 11 and which generates the light signals which are incident on the CCD sensor 3 for the production of a visual image corresponding to the x-ray image. The high-voltage generator 12 therefore informs the control unit 13 when no x-rays are being emitted by the x-ray source 30. When x-rays are being emitted, i.e., when an x-ray image is being produced, the control unit 13 maintains all previously set adjustment parameters to their current values. The adjustment procedure can be undertaken before the first use of the overall x-ray system, before the first daily use, or between individual x-ray examinations, as desired. The objective lens 2 is coupled to the collimating optics of an x-ray image intensifier (not shown) in a known manner, such as described, for example, in German OS 26 51 307.

The matching or balancing system disclosed herein can be incorporated in a known x-ray video system as described, for example, in U.S. Pat. No. 4,423,521, the teachings of which are incorporated herein by reference. The CCD sensor 3 is thereby incorporated in the video camera tube of that known system, the camera tube being a part of the video processor 11 shown in the drawing herein.

Although modifications and changes may be suggested by those skilled in the art, it is the intention of the inventor to embody within the patent warranted hereon all changes and modifications as reasonably and properly come within the scope of his contribution to the art.

I claim as my invention:

1. A real-time x-ray video imaging system comprising:

means for generating a light image corresponding to an x-ray image;

processing means for converting said light image into a video image for display on a monitor, including a solid-state CCD sensor which scans said light image and which produces electrical signals corresponding to said light image, said CCD sensor having two outputs at which said electrical signals are present, said processing means including a main processing channel connected to one output of said CCD sensor, and having a plurality of electrical components and an output, and a measurement channel connected to the other output of said CCD sensor having a plurality of electrical components respectively corresponding to said components in said main processing channel and having an output;

means for successively subjecting said CCD sensor to a plurality of selected, controlled, differing illumination conditions;

means, during each selected illumination condition of said CCD sensor, for comparing the outputs of said main processing channel and said measurement channel and for individually adjusting electrical components in said measurement channel for compensating for deviations in the electrical components in said main processing channel from respective selected values; and means for combining the respective outputs of said main processing channel and said measurement channel for producing a video signal for display on said monitor.

2. A real-time x-ray imaging system as claimed in claim 1 further comprising means for selecting a portion of the overall x-ray image for compensation using said measurement channel.

3. An x-ray video imaging system as claimed in claim 1 wherein said means for subjecting said CCD sensor to a plurality of selected, controlled differing illumination conditions comprises means for subjecting said CCD sensor to an unilluminated condition, wherein said plurality of electrical components in said main processing channel includes a first sampling/clamping unit, wherein said plurality of electrical components in said measurement channel includes a second sampling/clamping unit, and wherein said means for individually adjusting selected electrical components in said measurement channel for compensating for deviations in the electrical components in said main processing channel from respective selected values comprises means for identifying a difference between said electrical signals respectively in said main processing channel and said measurement channel while said CCD sensor is in said unilluminated condition and for adjusting said second sampling/clamping unit until said difference is substantially zero for dark current matching of said main processing channel and said measurement channel.

4. An x-ray video imaging system as claimed in claim 1 wherein said means for successively subjecting said CCD sensor to a plurality of selected, controlled, differing illumination conditions comprises means for illuminating said CCD sensor at an brightness level for causing said CCD sensor to emit said electrical signals at a level slightly below a level at which blooming occurs, wherein said plurality of electrical components in said main processing channel includes a first analog to digital converter, wherein said plurality of electrical components in said measurement channel includes a second analog-to-digital converter, and wherein said means for individually adjusting selected electrical components in said measurement channel for compensating for deviations in the electrical components in said main processing channel from respective selected values comprises means for identifying a difference between said electrical signals in said main processing channel and said measurement channel while said CCD sensor is illuminated at said brightness level and for adjusting said second analog-to-digital converter until said difference is substantially zero for white level matching of said main processing channel and said measurement channel.

5. An x-ray video imaging system as claimed in claim 1 wherein said means for successively subjecting said CCD sensor to a plurality of selected, controlled, differing illumination conditions comprises means for subjecting said CCD sensor to a plurality of successive brightness levels increasing in steps, wherein said plurality of electrical components in said measurement channel includes control means for introducing a selected linearity distortion into said electrical signal in said measurement channel, and wherein said means for individually adjusting selected components in said measurement channel for compensating for deviations in the electrical components in said main processing channel from respective selected values comprises means for identifying a difference between the respective electrical signals in said main processing channel and said measurement channel while said CCD sensor is illuminated at each of said brightness levels, means for identifying a brightness level in which said difference is a maximum, and means for adjusting said control means in said measurement channel for setting said linearity distortion introduced into said electrical signal of said measurement channel by said control means dependent on the brightness level in which said maximum occurred until said difference is substantially zero for linearity matching of said main processing channel and said measurement channel.

6. An x-ray video imaging system as claimed in claim 1 wherein said means for subjecting said CCD sensor to a plurality of selected, controlled, differing illumination conditions comprises means for subjecting said CCD sensor to a first illumination condition in a first adjustment phase and for subjecting said CCD sensor to a second illumination condition in a second adjustment phase and for subjecting said CCD sensor to a third illumination condition in a third adjustment phase, and wherein said means for individually adjusting selected electrical components in said measuring channel for compensating for deviations in the electrical components in said main processing channel from respective selected values comprises means, in each of said first, second and third adjustment phases, for identifying a difference between said electrical signals respectively in said main processing channel and said measurement channel while said CCD sensor is respectively in said first, second and third illumination conditions and for adjusting an electrical component in said plurality of electrical components in said measurement channel until said difference in the respective measurement phase is substantially zero.

7. An x-ray video imaging system as claimed in claim 6 wherein said means for individually adjusting selected electrical components in said measurement channel for compensating for deviations in the electrical components in said main processing channel from respective selected values comprises means for repeating said first, second and third measurement phases until said difference in all of said phases is substantially zero.

* * * * *